US009438026B2

(12) United States Patent
Franks et al.

(10) Patent No.: US 9,438,026 B2
(45) Date of Patent: Sep. 6, 2016

(54) CIRCUIT BREAKER PANEL WITH WIRELESS COMMUNICATIONS CAPABILITY

(71) Applicants: Jeffrey L. Franks, Angleton, TX (US); Stephen E. Williams, Spring, TX (US); Ray Cole, Georgetown, TX (US)

(72) Inventors: Jeffrey L. Franks, Angleton, TX (US); Stephen E. Williams, Spring, TX (US); Ray Cole, Georgetown, TX (US)

(73) Assignee: Unilectric, LLC, Round Rock, TX (US)

( * ) Notice: Subject to any disclaimer, the term of this patent is extended or adjusted under 35 U.S.C. 154(b) by 193 days.

(21) Appl. No.: 14/168,399

(22) Filed: Jan. 30, 2014

(65) Prior Publication Data
US 2014/0146431 A1    May 29, 2014

Related U.S. Application Data

(63) Continuation of application No. 13/574,946, filed as application No. PCT/US2011/022438 on Jan. 25, 2011, now Pat. No. 8,681,463.

(60) Provisional application No. 61/298,104, filed on Jan. 25, 2010, provisional application No. 61/298,018, filed on Jan. 25, 2010.

(51) Int. Cl.
| H02H 3/10 | (2006.01) |
| H02H 1/00 | (2006.01) |
| H02H 3/32 | (2006.01) |
| H02H 7/26 | (2006.01) |
| H01H 71/74 | (2006.01) |
| H02H 3/00 | (2006.01) |
| H02H 3/04 | (2006.01) |
| H01H 71/12 | (2006.01) |
| H02H 3/08 | (2006.01) |

(52) U.S. Cl.
CPC ........... *H02H 3/105* (2013.01); *H02H 1/0015* (2013.01); *H02H 3/10* (2013.01); *H02H 3/32* (2013.01); *H02H 7/263* (2013.01); *H01H 71/123* (2013.01); *H01H 71/74* (2013.01); *H02H 1/0061* (2013.01); *H02H 3/006* (2013.01); *H02H 3/04* (2013.01); *H02H 3/08* (2013.01)

(58) Field of Classification Search
CPC .......... H02H 3/006; H02H 3/04; H02H 3/10; H02H 3/105; H02H 1/0015; H01H 71/74
USPC ....................................................... 361/93.2
See application file for complete search history.

(56) References Cited

U.S. PATENT DOCUMENTS

| 5,185,705 A * | 2/1993 | Farrington ............... H02H 3/04 361/115 |
| 6,292,717 B1 * | 9/2001 | Alexander ......... G01R 19/2513 340/6.1 |
| 6,654,219 B1 * | 11/2003 | Romano ............... H02H 1/0015 324/500 |
| 8,310,370 B1 | 11/2012 | Williams, Jr. et al. |
| 2002/0030953 A1 * | 3/2002 | Ziegler ................. H01H 83/04 361/42 |
| 2002/0032535 A1 | 3/2002 | Alexander et al. |
| 2003/0171039 A1 | 9/2003 | Pierson, Jr. |
| 2005/0043861 A1 | 2/2005 | Thompson |
| 2005/0243491 A1 | 11/2005 | Tanis |
| 2006/0087782 A1 | 4/2006 | Michalko et al. |
| 2006/0279884 A1 | 12/2006 | Valdes et al. |

(Continued)

*Primary Examiner* — Thienvu Tran
*Assistant Examiner* — Kevin J Comber

(57) ABSTRACT

In at least some embodiments, a system includes a plurality of circuit breakers and trip control logic external to and coupled to the circuit breakers. The trip control logic enables a plurality of different tripping options to be selected for each of the circuit breakers.

18 Claims, 4 Drawing Sheets

(56) References Cited

U.S. PATENT DOCUMENTS

| | | |
|---|---|---|
| 2007/0223160 A1 | 9/2007 | Coffey et al. |
| 2008/0316004 A1 | 12/2008 | Kiko |
| 2009/0021879 A1 | 1/2009 | Rivers, Jr. et al. |
| 2010/0157497 A1* | 6/2010 | Williams ........... H01H 71/7409 361/93.3 |
| 2010/0188785 A1* | 7/2010 | Gascuel ................. H02H 3/04 361/18 |
| 2010/0274403 A1 | 10/2010 | Maeda et al. |

* cited by examiner

CIRCUIT BREAKER PANEL WITH WIRELESS COMMUNICATIONS CAPABILITY

CROSS-REFERENCE TO RELATED APPLICATIONS

This application is continuation of U.S. application Ser. No. 13/574,946 filed Jul. 24, 2012, which is the U.S. National Stage under 35 U.S.C. §371 of International Patent Application No. PCT/US2011/022438 filed Jan. 25, 2011, which claims priority to: U.S. Provisional Patent Application No. 61/298,018 filed Jan. 25, 2010, entitled "Circuit Breaker Panel Box"; and U.S. Provisional Patent Application No. 61/298,104 filed Jan. 25, 2010, entitled "Circuit Breaker Panel Box With Communication Gateway". The above priority documents are hereby incorporated herein by reference in their entirety.

STATEMENT REGARDING FEDERALLY SPONSORED RESEARCH OR DEVELOPMENT

Not applicable.

BACKGROUND

Circuit breakers provide an automatic switching mechanism that responds to fault conditions (e.g., overload or short circuit) by interrupting continuity of a circuit to discontinue electrical flow. Arc-fault circuit interrupt (AFCI) and ground-fault circuit interrupt (GFCI) are newer circuit breaker technologies that respectively detect the fault conditions of arc-fault and ground-fault. Typically, a circuit breaker panel includes many circuit breakers, each protecting a different branch circuit. The implementation of different fault detection technologies for different circuit breakers of a circuit breaker panel is not a trivial task.

SUMMARY

In at least some embodiments, a system includes a plurality of circuit breakers and trip control logic external to and coupled to the circuit breakers. The trip control logic enables a plurality of different tripping options to be selected for each of the circuit breakers.

In at least some embodiments, a circuit breaker panel includes fault detection logic within each of a plurality of circuit breakers associated with the circuit breaker panel. The circuit breaker panel also includes trip control logic coupled to each fault detection logic and located exterior to the plurality of circuit breakers. The trip control logic enables a plurality of different tripping options to be selected for each of the circuit breakers.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
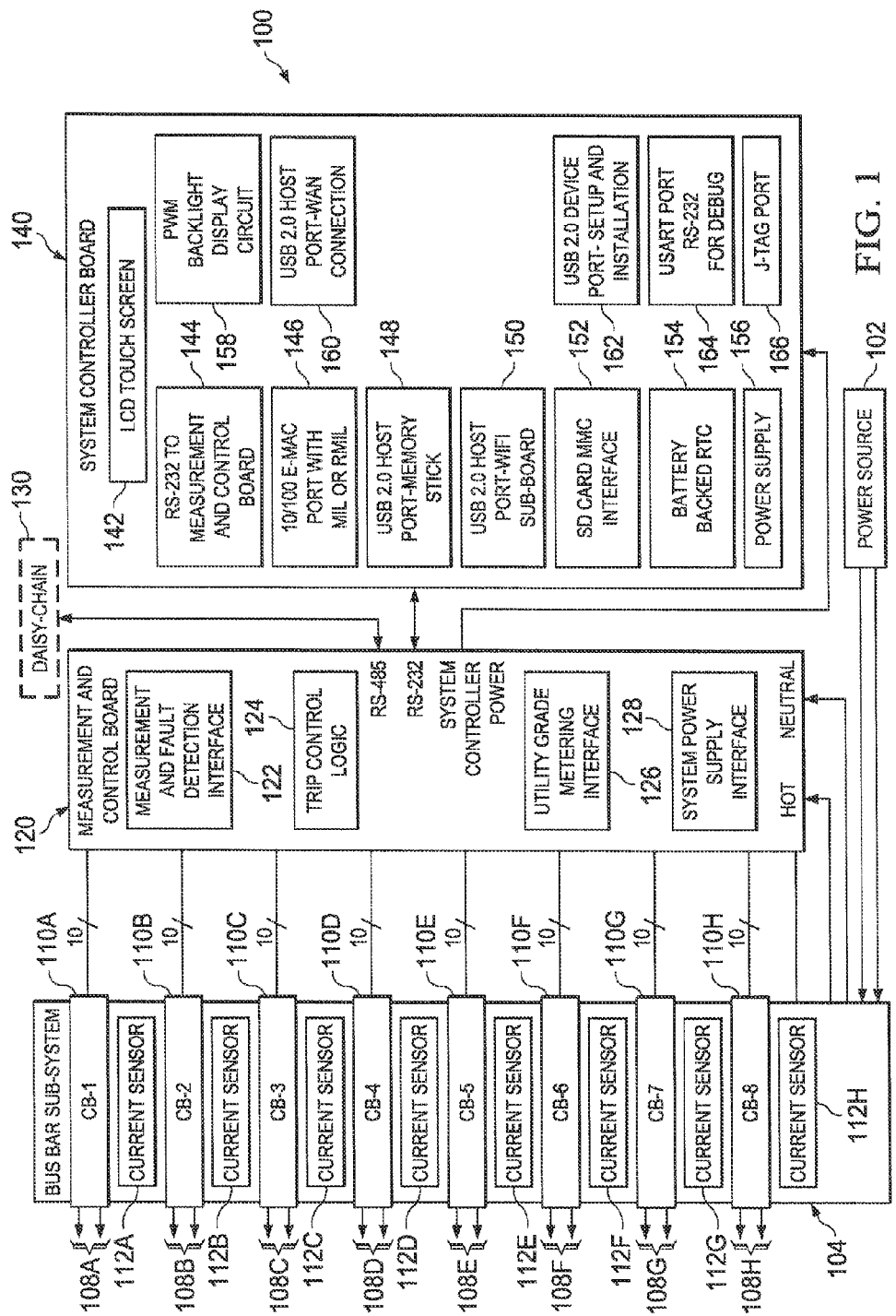
FIG. 1 shows a system in accordance with an embodiment of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are methods and systems for providing dynamic control of tripping options for a plurality of circuit breakers. Also disclosed herein is a circuit breaker panel configuration that facilitates interaction between a user and the circuit breaker panel and/or between an electricity utility provider and the circuit breaker panel. Also disclosed herein is a circuit breaker panel configuration that enables multimedia/internet transmissions to be received via the circuit breaker panel. Additionally, at least some embodiments of the disclosed circuit breaker panel configuration provide an interface for communications between a user and electrical appliances powered via the circuit breaker panel.

In at least some embodiments, a circuit breaker panel provides overload protection for an eight branch circuit protection product. The circuit breaker panel may be a 60 Amp service box with 20 Amp circuit breakers. The following items make up the basic foundation for the disclosed circuit breaker panel: 1) an electrical panel box providing 60 Amp, single phase service, 120 VAC/240 VAC 50/60 Hz; 2) branch circuit over-current protection devices (circuit breakers) that have a remote trip capability; 3) circuit breakers that provide stand-alone circuit protection based upon bi-metal trip actuation; 4) sensors that are integrated into the circuit breakers for ground fault event detection and/or arc fault event detection; 5) circuit breakers that are single pole devices rated for 120 VAC/240 VAC, 50/60 Hz, 20 Amp; 6) circuit breakers that fit into a plastic enclosure (referred herein as a "circuit breaker nest") designed to hold up to eight circuit breakers; 7) electrical bus bars and shunt measurement sensors that are integrated into a measurement and control board described herein which may be located in the circuit breaker nest; 8) circuit breakers that make connection to the line-side electrical bus bars without exposure to the user; and 9) circuit breakers that mate with remote sensing and control connectors located on the measurement and control board.

The items listed above can be tested as a stand-alone system to provide basic branch circuit over-load protection. This configuration is not dependent on use the measurement and control board described herein except for those elements that make up the bus bar system and main electrical connections. Various auxiliary features may be added to the branch circuit over-protection configuration of the circuit breaker panel. These auxiliary features include: 1a) the circuit breaker nest is improved to include two fully populated circuit boards (a measurement and control board, and a system controller board) for control, measurement, sensing, and user interface options; 1b) smart circuit breaker functionality is utilized to implement Ground-Fault Circuit Interrupt (GFCI) and Arc-Fault Circuit Interrupt (AFCI) capability); 2) the measurement and control board, and the system controller board are sealed inside the nest such that they become tamper proof; 3) the measurement and control board provides high quality electrical utility metrology functions for total power and also enables branch circuit measurement/control to become functional; 4) the system controller board provides the Human Machine Interface (HMI) using a display (e.g., a TFT touch screen); 5) the display has an integrated touch screen that is utilized to setup and observe auxiliary features that specialize each branch circuit; 6) the display provides status, time, power measurement information, plus a means for testing auxiliary functions; 7) the display shows circuit events, fault detection, and fault characterization (e.g., over-current, ground-fault, arc-fault, line spikes, brown-out, quality of power); 8) use of the HMI for setup by installation personnel to add functionality such as branch circuit characterization (name, usage, etc.), branch circuit prioritization, and branch circuit enabled features (GFCI, AFCI, etc.).

In at least some embodiments, the disclosed circuit breaker panel (e.g., using the system controller board) provides a gateway into the home from a communications provider. This can be by means of a hard copper connection, fiber optics, cell tower, or proprietary WAN. Protocols handle remote logging and control by means of the communications connectivity, irrespective of the connecting means. One implementation of the communications gateway is by use of a communications module that is supplied by the communications provider. This communication module connects to the system controller board, for example, via a USB 2.0 connection. In at least some embodiments, the communications module is set up by the provider in order to complete a radio frequency (RF) interface compatible with cell tower protocols. This equipment provides at least 3G and possibly 4G service, if available. This communication module is mounted on the outside of the house and connects to the system controller board via a USB 2.0 cable through the wall of the house.

Some of the communication features supported by the disclosed circuit breaker panel are as follows: 1) provide high-speed streaming services (WAN); 2) route communications to end-point appliances in a Home Area Network (HAN) via the system controller board; 3) provide functionality for VoIP, streaming video, streaming audio and/or internet connectivity; 4) provide connectivity from/to the electric utility provider; 5) add utility provider functionality for remote meter reading, control of power to the residence (turn power on or off), demanding side power control (control branch circuits based on priority and usage), provisioning time-of-use metrology information, supporting VPN and SCADA protocols to secure the connections and communications platform and format that the electric utility provider uses, supporting supervisory protocols whereby information can be sent either direction, supporting use of supervisory information for multiple purposes, none of which are mutually exclusive of each other (e.g., for logging, metering and/or control); 6) use of the HMI for setup by a communications provider and/or an electric utility provider; 7) user of the HMI for communications setup (e.g., routing, IP address, GPS co-ordinates, SIM setup, credentials, VPN, and elements of the Home Area Network (HAN)); 8) use of the HMI for electric utility setup (e.g., customer account number, credentials, VPN, SCADA setup); and 9) end-point wireless connectivity to devices inside the house is accomplished by means of sub-boards (WiFi and/or ZigBee communication boards) that are attached to the system controller board. The sub-boards provide various features as follows: 1) the system controller board contained in the circuit breaker nest is configured with the appropriate sub-board(s) to enable additional end-point wireless communications inside the house; and 2) various end-point communications are supported including: VoIP (telephone), streaming audio (music), streaming video (TV), internet connections (laptop computer), and smart-box connections (laptop computer)

FIG. 1 shows a system 100 in accordance with an embodiment of the disclosure. As shown, the system 100 comprises a plurality of circuit breakers 106A-106H coupled to a bus bar sub-system 104. For each circuit breaker 110A-110H, current sensor logic 112A-112H is also provided. Each circuit breaker 110A-110H provides fault protection for a corresponding branch circuit 108A-108H that receives power from power source 102.

In FIG. 1, each circuit breaker 110A-110H couples to trip control logic 124. In at least some embodiments, the trip control logic 124 is mounted to a measurement and control board 120. The measurement and control board 120 includes, for example, a measurement and fault detection interface 122 through which power sense signals and fault sense signals are received from the circuit breakers 110A-110H.

The trip control logic 124 operates to provide a default (e.g., overload) tripping option, an arc-fault circuit interrupt (AFCI) tripping option, a ground-fault circuit interrupt (GFCI) tripping option, and a AFCI/GFCI tripping option for each of the circuit breakers 110A-110H. In at least some embodiments, the tripping option for each circuit breaker 110A-110H is selectable by a user via a user interface (e.g., touch screen 132) in communication with the trip control logic 124. The tripping option for each circuit breaker 110A-110H could also be selected via a local or remote computing device configured to communicate with the trip control logic 124.

As shown, the measurement and control board 120 also comprises utility grade metering logic 126 that determines power consumption information for the system 100 and that organizes, formats, and selectively transmits the power consumption information to a utility metering collection site (not shown). The measurement and control board 120 also comprises a power supply interface 128 that outputs different voltage levels for different components of the system 100. For example, the trip control logic 124 and the utility grade metering logic 126 may operate using different voltage levels. The power supply interface 128 also may provide power to components of a system controller board 140 in communication with the measurement and control board. In at least some embodiments, the measurement and control board 120 and the system controller board 140 communicate via a RS-232 interface. Further, multiple measurement and control boards 120 may be daisy-chained 130 (e.g., via a RS-485 interface) as needed to support additional circuit breakers. In this manner, the total number of circuit breakers in the system 100 can be extended as needed by replicating the measurement and control board 120 operations (trip control loop functionality) for additional circuit breakers. Even if the number of measurement and control boards 120 increases, only one system controller board 140 need be used for system 100.

As shown, the system controller board 140 comprises a touch screen 142 (e.g., a TFT touch screen or other touch screen technology). The touch screen 142 displays information to a user and also enables a user to interact with control features of the system 100 and/or to request information regarding the system 100. As previously mentioned, a user/administrator should be able to set (and dynamically update) a default tripping option, an arc-fault circuit interrupt (AFCI) tripping option, a ground-fault circuit interrupt (GFCI) tripping option, and a AFCI/GFCI tripping option for each of the circuit breakers of system 100. The system controller board 140 also comprises a pulse width modulation (PWM) backlight display circuit 158 that enables adjustment of the backlight intensity used to illuminate the touch screen 142.

The system controller board 140 also comprises several communication interfaces including: a RS-232 interface 144 to support communications with the measurement and control board 120; a 10/100 E-MAC port 146 with media independent interface (MI1) or reduced media independent interface (RM11); a USB 2.0 host port 148 with memory stick compatibility; a USB 2.0 host port 150 for optional communications to a WiFi daughter board; a Secure Digital (SD) card multimedia card (MMC) interface 152; a USB 2.0 host port 160 for Wide Area Network (WAN) connectivity; a USB 2.0 device port 162 for setup and installation of control software/firmware of the system 100; a universal asynchronous receiver/transmitter (USART) port 164 compatible with RS-232 for debugging control software/firmware of the system 100; and a J-TAG port 166 for test and debug operations. The system controller board 140 also comprises a power supply interface 156 to adjust power supply voltage levels for different components of the system controller board 140. Further, the system controller board 140 comprises a battery-backed real-time clock (RTC) 154 to clock various hardware components of the system controller board 140.

The components of the measurement and control board 120 and the system controller board 140 are examples only and are not intended to limit embodiments of the disclosure to particular communication interfaces or control schemes. In general, each measurement and control board 120 provides a trip control loop for up to a predetermined number of circuit breakers (e.g., 8 circuit breakers). The trip control loop is implemented with circuit breakers that are able to sense all fault conditions that could be used to trigger tripping of a circuit breaker. In order to customize the tripping conditions for circuit breakers that are able to detect a plurality of fault conditions, the fault sense signals and power sense signals detected by the circuit breakers are passed to the trip control loop, which manages the specific trip conditions for each circuit breaker separately. In this manner, the tripping conditions for each of a plurality of circuit breakers (e.g., 110A 110H), providing fault protection for different branch circuits (e.g., branch circuits 108A-108H), can be customized and updated as needed.

Meanwhile, the system controller board 140 provides user interface options and communication features that enhance the role of a circuit breaker system or panel. For example, the user interface features of system controller board 140 are used to provide power consumption information, appliance management, and circuit breaker management to a user/administrator of the system 100. Meanwhile, the communication features of system controller board 140 enable testing, debugging, endpoint communications with appliances, communications with electrical receptacles and/or receipt of multimedia services (e.g., internet, VOIP, television, streaming radio/audio, etc.) for a home area network (HAN).

In some embodiments, the trip control loop components of measurement and control board 120 could be combined with the user interface features and/or the communication features of system controller board 140 on a single control board. In general, the trip control loop components, the user interface features and the communication features described herein could be spread across multiple control boards in different ways without changing the operations of system 100. Further, the user interface features and the system controller board 140 described herein does not exclude the possibility of managing features of the system 100 using a separate computer system or portable control device configured to communicate with control logic of the system 100. In other words, a user/administrator of system 100 could manage features of the system 100 using a pre-integrated user interface (e.g., touch screen 142), a separate user interface (e.g., a computing device running appropriate software), or both.

In at least some embodiments, the management of features for system 100 could be divided into user-managed features and administrator-managed features. In other words, there may be features of system 100 that only an end user (e.g., a home owner) should be able to access. For example, a user may select color and style options for the HMI, enable/disable an audible notification for non-critical events (advertisements), set feedback criteria regarding power consumption for branch circuits and the entire system. Furthermore, there may be other features of system 100 that only a system installer (e.g., an electrical contractor) should be able to access. For example, the system installer can name the branch circuits, set priorities for branch circuits and/or set tripping options for each branch circuit. Furthermore, there may be other features of system 100 that only a communication provider should be able to access. For example, the communication provider sets up time zone information, GPS coordinates, network time protocols, VPN options, authentication credentials for the communication provider, enable/disable features of the system (fire/police/emergency response options). Furthermore, there may be other features of system 100 that only an electric utility provider should be able to access. As an example, an electric utility provider may set up account numbers, SCADA access information, credentials for later access (username/password), routing information for communications (e.g., VPN options).

In at least some embodiments, the electric utility provider is able to access system 100 remotely to collect power consumption information and/or to selectively trip circuit breakers of system 100. In at least some embodiments, if the electric utility provider trips a circuit breaker, the trip control logic 124 causes the circuit breaker to continue tripping (manually resetting of the circuit breaker switch is ineffective) until the electric utility provider signals to the trip control logic 124 that use of the tripped circuit breaker is allowed. In this manner, the electric utility provider can prevent misuse of the system 100, or even misuse of individual circuit breakers and their corresponding branch circuits.

Figure 2:
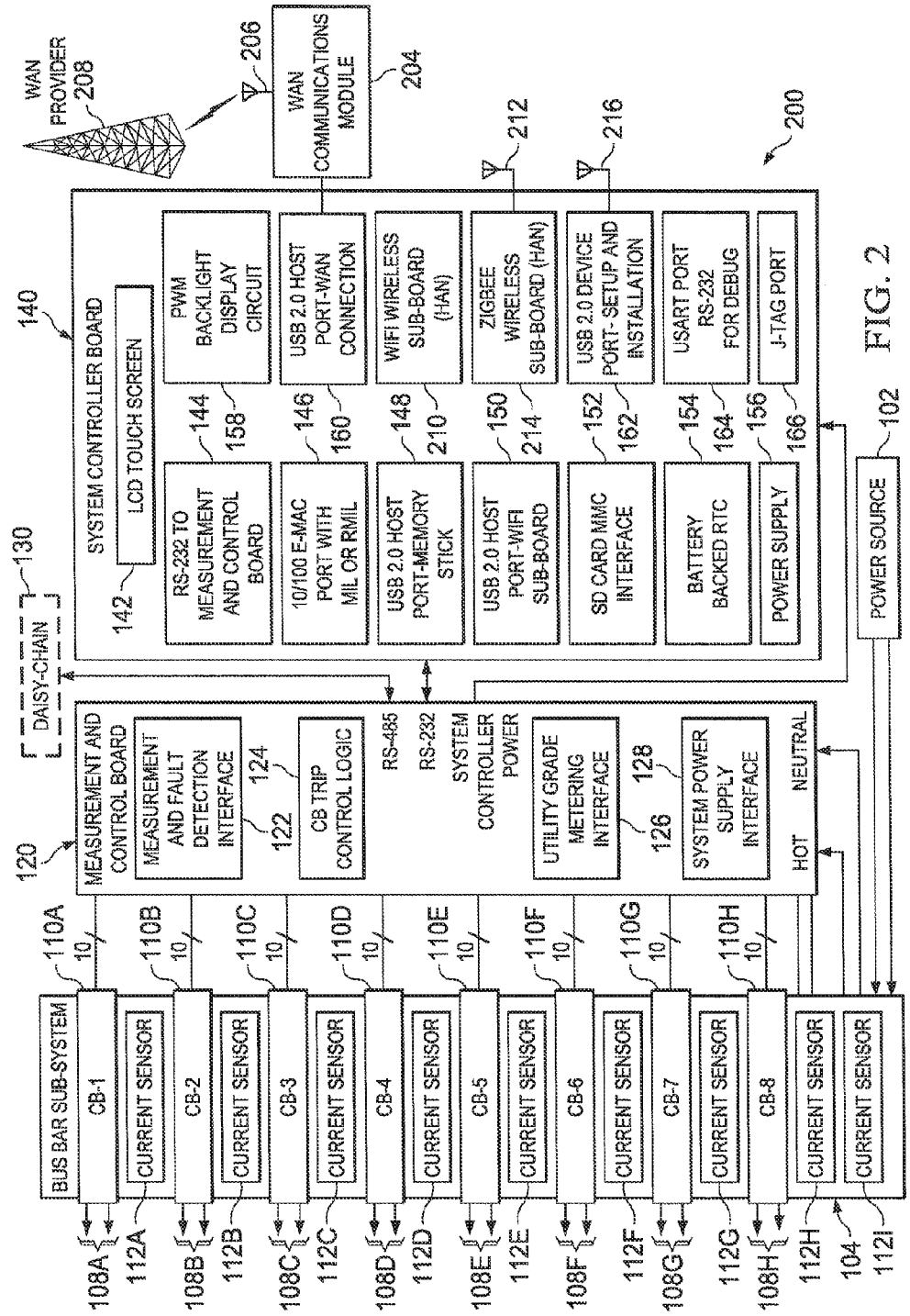
FIG. 2 shows a system in accordance with another embodiment of the disclosure.

FIG. 2 shows a system 200 in accordance with another embodiment of the disclosure. The system 200 of FIG. 2 is similar to the system 100 of FIG. 1, but shows additional communication features. In FIG. 2, the system 200 comprises a WAN communications module 204 with antenna 206 coupled to the USB 2.0 host port 160 for Wide Area Network (WAN) connectivity. In this manner, the WAN communication module 204 and antenna 206 enable communications with WAN provider 208.

System 200 also shows the addition of a WiFi wireless sub-board 158 with antenna 160 to the system controller board 140. The WiFi wireless sub-board 158 enables communications for home area network (HAN) services. System 200 also shows the addition of a ZigBee wireless sub-board 162 with antenna 164 to enable communications with compatible electrical appliances and receptacles.

Figure 3:
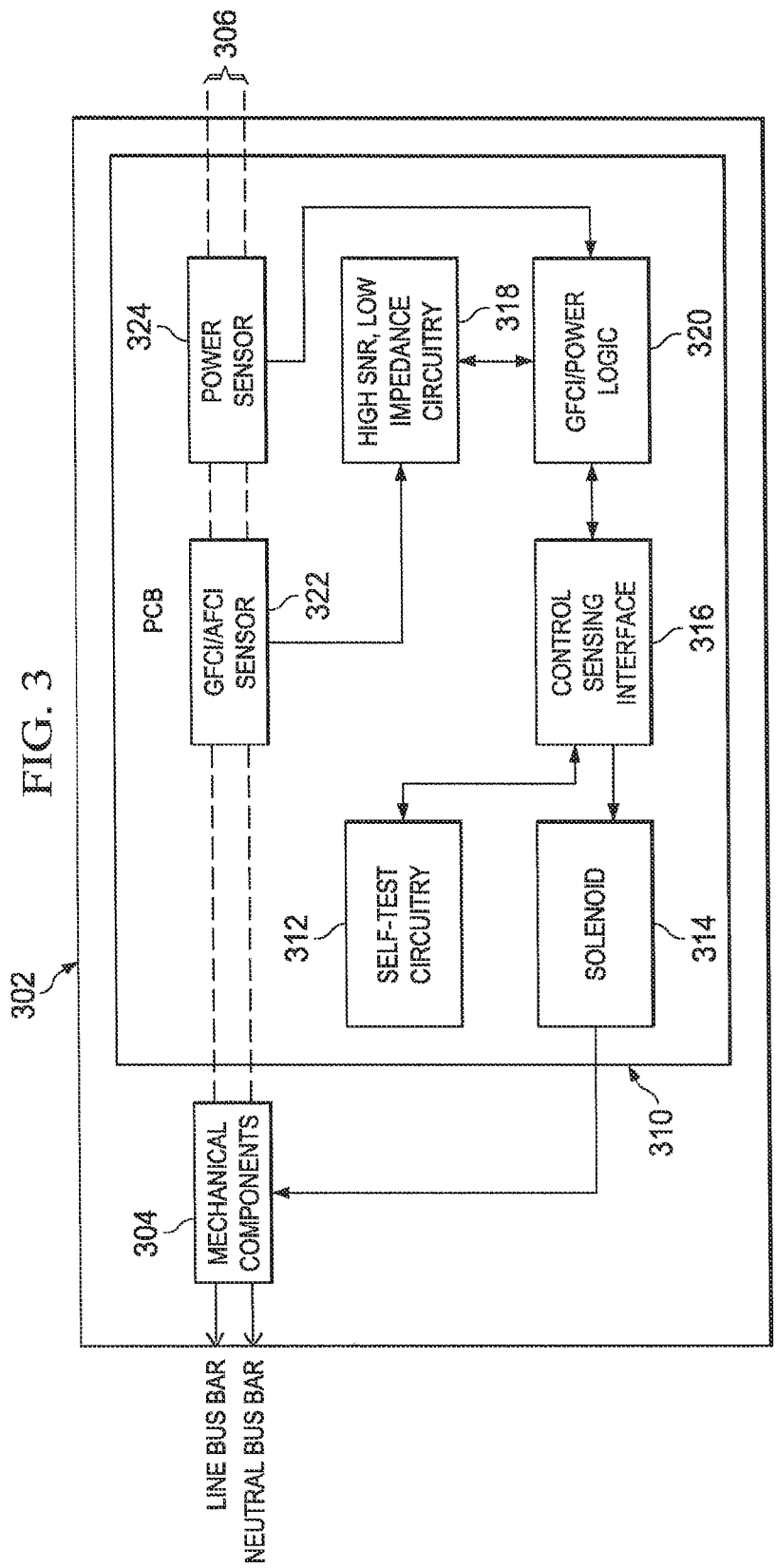
FIG. 3 shows a block diagram of a circuit breaker in accordance with an embodiment of the disclosure.

FIG. 3 shows a block diagram of a circuit breaker 302 in accordance with an embodiment of the disclosure. The circuit breaker 302 comprises mechanical components 304 that selectively break continuity of a branch circuit 306. In at least some embodiments, the mechanical components 304 couple to a line bus bar and a neutral bus bar without wires (i.e., direct contact between conductors corresponding to the at least some of the mechanical components 306 and with both the line bus bar and the neutral bus is made possible). The mechanical components 304 are activated by a solenoid 314 that can be triggered using electrical control signals. Once the mechanical components 304 are "tripped" (breaking the continuity of branch circuit 306) by energizing the solenoid 314, the mechanical components 304 have to be manually reset to restore continuity to the branch circuit 306.

In at least some embodiments, the circuit breaker 302 comprises GFCI/AFCI sensors 322 and power sensor 324 in-line with the branch circuit 306. The GFCI/AFCI sensors 322 is configured to provide fault sense signals to GFCl/power logic 320 via high signal-to-noise ratio (SNR), low impedance circuitry 318. The high SNR, low impedance circuitry 318 improves the performance of fault detection for circuit breaker 302. Meanwhile, the power sensor 324 provides power sense signals directly to GFCl/power logic 320. With the power sense signals from the power sensor 324 and the fault sense signals from the GFCl/AFCI sensor 322, the GFCl/power logic 320 is able to identify faults including overload faults, AFCI faults and GFCI faults. If GFCl/power logic 320 identifies a fault, a corresponding fault signal is output by the GFCl/power logic 320. Instead of energizing the solenoid directly based on the fault signal output by GFCl/power logic 320, the circuit breaker 320 causes any fault signals output by GFCl/power logic 320 to be diverted to control sensing interface 316, which carries fault signals output by the GFCl/power logic 320 to a trip control loop (e.g., the trip control logic 124 on measurement and control board 120). The trip control logic 124, outside of the circuit breaker 302, determines whether to trip the circuit breaker 302 depending on the tripping option (e.g., a default (e.g., overload) tripping option, an AFCI tripping option, a GFCI tripping option, and a AFCl/GFCI tripping option) selected for the selected for the circuit breaker 302. The tripping option for the circuit breaker 302 can be adjusted as needed (external to and separate from the fault detection capabilities of the circuit breaker 302) by configuring the trip control logic 124. In other words, the circuit breaker 302 is able to detect fault conditions for all of the tripping options available, but it is the trip control loop (external to the circuit breaker 302) that determines whether to ignore a detected fault or to trip the mechanical components 304 in response to a detected fault.

For example, the trip control logic 124 (external to the circuit breaker 302) may be set to cause the circuit breaker 302 to operate using the default tripping option. With the default tripping option, all fault conditions (overload, AFCI, GFCI) detected by the GFCI logic 320 will be diverted to the trip control logic 124. In response, the trip control logic 124 will cause the solenoid 312 to be energized for overload detection, but not for AFCI detection nor for GFCI detection. With the AFCI tripping option, all fault conditions detected by the GFCI logic 320 will be diverted to the trip control logic 124. In response, the trip control logic 124 will cause the solenoid 312 to be energized for overload detection or for AFCI detection, but not for GFCI detection. With the GFCI tripping option, all fault conditions detected by the GFCI logic 320 will be diverted to the trip control logic 124. In response, the trip control logic 124 will cause the solenoid 312 to be energized for overload detection or for GFCI detection, but not for AFCI detection. With the AFCl/GFCI tripping option, all fault conditions detected by the GFCI logic 320 will be diverted to the trip control logic 124. In response, the trip control logic 124 will cause the solenoid 312 to be energized for overload detection, for AFCI detection, or for GFCI detection.

As shown, the circuit breaker 302 also comprises self-test circuitry 312 coupled to the control sensing interface 316. The self-test circuitry 312 enables test signals to be sent to the trip control logic 124 via the control sensing interface to test the overall functionality of the circuit breaker 302 and the trip control logic 124. The self-test circuitry 312 is operated by pressing a button or other contact accessible on the outer surface of the circuit breaker 302. The outer surface of the circuit breaker 302 also includes contact points (e.g., slide connectors and/or screws connectors) for the line bus bar and the neutral bus bar.

To summarize, system 100 describes a control system for a circuit breaker panel. The control system is divided such that fault detection logic is provided within each circuit breaker and trip control logic is provided external to each circuit breaker. In at least some embodiments, the fault detection logic within each circuit breaker is able to detect an overload condition, an AFCI condition, and a GFCI condition. Meanwhile, the trip control logic external to each circuit breaker is able to provide a default tripping option (overload only), an AFCI tripping option (overload and AFCI only), a GFCI tripping option (overload and GFCI only), and a AFCl/GFCI tripping option (overload, AFCI, and GFCI) in response to detected faults.

The control system for a circuit breaker panel also may comprise a user interface in communication with the trip control logic. The user interface enables a user to view power consumption information for the circuit breaker panel and/or to adjust each of the plurality of circuit breakers to operate with one of the default tripping option, the AFCI tripping option, the GFCI tripping option, and the AFCl/GFCI tripping option. The control system for a circuit breaker panel also may comprise a utility metering interface coupled to the plurality of circuit breakers. The utility metering logic selectively transmits power consumption information for the circuit breaker panel to a utility company and may enable the utility company to selectively disable each of the circuit breakers. The control system for a circuit breaker panel also may comprise a networking interface that provides multimedia features for a home area network (HAN) and/or an endpoint communications interface that enables communications between appliances/receptacles and the circuit breaker panel.

The number of circuit breakers in a circuit breaker panel box may vary according to the size of the home/business for which the circuit breaker panel box is intended and/or government regulations. In accordance with at least some embodiments, the circuit breaker panel box models may have 4, 6, 8, 12, 16, 20, 40 or more circuit breakers. As the number of circuit breakers includes, the amount of trip control loop circuitry also increases. In other words, the trip control loop circuit described herein may implement a control chip compatible with a predetermined number of circuit breakers (e.g., 8). If the number of circuit breakers is greater than the predetermined number, the number of control chips is increased. As needed, multiple control chips may be daisy-chained with regard to communications being received to the circuit breaker panel box or communications being transmitted from a circuit breaker panel box.

Embodiments of circuit breaker panel boxes may vary with respect to the number of circuit breakers, the positioning of circuit breakers (e.g., vertical or horizontal), the use of a display and/or LEDs, the size and location of a display, the software configuration, the cross bar position/shape, the use of a meter, the location of the meter, the use of an antenna for wireless communications, the wireless frequency and protocol, and the ability to communicate with utility company devices for measurements, logging, and remote control of circuit breakers. In some embodiments, the various features of a circuit breaker panel box are available for selection by a customer, but not required. Further, the selection of AFCI and/or GFCI is optional for each circuit breaker.

In some embodiments, the control circuitry of a circuit breaker panel box is capable of supporting all the features described herein. However, not all the features need be selected by each customer and thus the implementation of circuit breaker panel boxes may vary. Further, a customer may later decide to upgrade circuit panel boxes (e.g., add a display, upgrade software, add wireless communications, etc.) without having to replace the entire circuit breaker panel box.

In some embodiments, TV, Ethernet and/or Cable will be able to connect to the circuit breaker panel box without regard to the utility company. For example, plugs/ports and related protocols may be implemented with the circuit breaker panel box to achieve this added functionality. Further, the communications for TV, Ethernet and/or Cable may be accomplished via the power line or wireless hardware/protocols. In the home/business, an appropriate adapter/modem may be implemented to convert signals as needed.

In accordance with at least some embodiments, circuit breaker panel box embodiments are configured to provide one or more of: 1) a design that enables circuit breakers to plug into both the hot (line) and neutral bus bars without wires; 2) a touch screen; 3) programmability so that voltage and safety requirements (e.g., GFCI/AFCI) can be programmed into each circuit breaker from a user interface in the circuit breaker panel box; 4) mitigation of shock from a live wire; 5) enabling an end user to monitor power consumption per appliance in real-time; 6) the ability to program GFCI and AFCI on all wired pathways; 7) programmability of appliance consumption at the circuit breaker panel box or remotely; 8) an automatic soft start feature that eliminates spikes in power during restart.

In accordance with at least some embodiments, each circuit breaker is configured to provide one or more of: 1) eliminate separate metering and related maintenance costs; 2) remote monitoring/reading of power consumption; 3) remote shut off and turn on; 4) alerts to the utility company regarding theft of power at the home level and/or to automatically shut down in response to a theft event; 5) enable the utility company to control consumption at the home level at a per-breaker level; 6) functionality with any broadband over power line (BPL) network, mesh network, or other wired or wireless network; 7) eliminate the need for different meters if the utility company installs more than one communication interface or meter (depends on whether utility company upgrades); 8) act as an open source Gateway into the home or office providing the utility company with additional income sources after a BPL network has been installed; 9) eliminates labor intensive manual meter reading and associated costs.

In accordance with at least some embodiments, a circuit breaker panel box that operates as breaker/meter Gateway Profit Center is configured to provide one or more of: 1) an open source Gateway into and out of the home or office; 2) an open architecture that adapts to any communications software; 3) software that allows a communications customer such as an Internet provider or telephone provider to connect directly to the circuit breaker panel box or to enable the electric utility company to provide service to the end user; 4) eliminating internal home or office wiring or cabling once the box is connected; 5) enabling an end user to plug a TV or computer into the standard home or office receptacle and receive the communications delivered by the provide; 6) enabling the utility company to profit by using the BPL capability as well as connectivity features of the circuit breaker panel box to third party commercial companies; 7) allowing third party access to the home without wiring inside the home or office (the system allows communications delivery from standard electrical wiring inside the home or office); and 8) supporting remote upgrades from third parties while being completely safe with channel protection which provides a wall between the utility company and any third party application at the home or office level.

Figure 4:
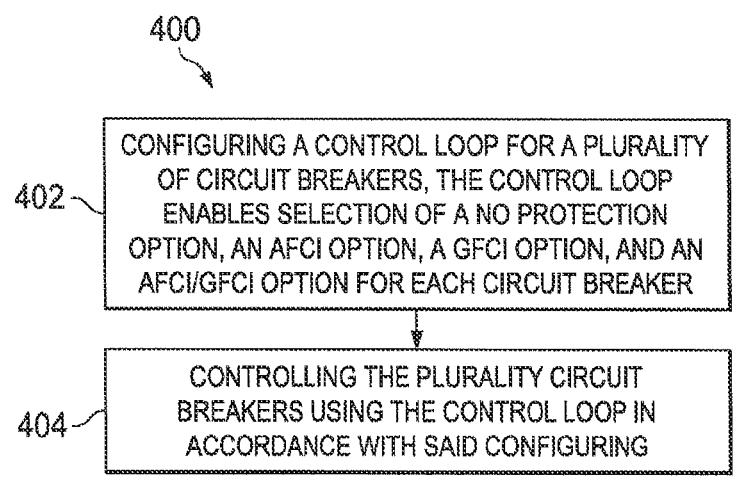
FIG. 4 shows a method in accordance with an embodiment of the disclosure.

FIG. 4 shows a method 400 in accordance with an embodiment of the disclosure. The method 400 comprises configuring a control loop for a plurality of circuit breakers, where the control loop enables selection of a default protection option, an AFCI protection option, a GFCI protection option, and an AFCI/GFCI protection option (block 402). The method 400 also comprises controlling the plurality of circuit breakers using the control loop in accordance with the previous configuring (block 404).

In at least some embodiments, the method 400 may additionally comprise receiving user input to set each of the plurality of circuit breakers to operate with one of the default tripping option, the AFCI tripping option, the GFCI tripping option, and the AFCI/GFCI tripping option. Additionally or alternatively, the method 400 may comprise receiving communications from a utility provider to remotely monitor and to control the plurality of circuit breakers. Additionally or alternatively, the method 400 may comprise managing home area network (HAN) communication features via the circuit breaker panel. Additionally or alternatively, the method 400 may comprise managing communications between a user and electrical appliances via the circuit breaker panel. Additionally or alternatively, the method 400 may comprise receiving multimedia transmissions via the circuit breaker panel.

The above discussion is meant to be illustrative of the principles and various embodiments of the present inven-

What is claimed is:

1. A circuit breaker system comprising:
a bus bar subsystem;
a plurality of circuit breakers, each circuit breaker including:
mechanical components and a solenoid for selectively breaking electrical continuity in an electrical path between a power source and corresponding line and neutral bus bars of the bus bar subsystem, the mechanical components adapted to connect to the corresponding line and neutral bus bars of the bus bar subsystem without wires;
sensor circuitry for monitoring the electrical path and detecting faults; and
logic circuitry coupled to the sensor circuitry for generating a fault detection signal identifying a type of fault detected by the sensor circuitry;
a first subsystem including:
trip control logic responsive to fault detection signals received from each of the plurality of circuit breakers, the trip control logic programmed to selectively activate the solenoid of a selected one of circuit breakers and independently break the continuity of the corresponding electrical path in response to a particular type of fault identified by a fault detection signal received from the selected circuit breaker; and
a communications interface; and
a second subsystem including:
a communications interface for exchanging signals with the communications interface of the first subsystem; and
wireless communications circuitry for establishing wireless communications with a system external to the circuit breaker system.

2. The circuit breaker system of claim 1, wherein the first and second subsystems are disposed on corresponding first and second circuit boards and the communications interfaces exchange serial data via the RS-232 protocol.

3. The circuit breaker system of claim 1, further comprising:
a bus bar subsystem;
a second plurality of circuit breakers, each of the second plurality of circuit breakers including:
mechanical components and a solenoid for selectively breaking electrical continuity in an electrical path between a power source and corresponding line and neutral bus bars of the bus bar subsystem, the mechanical components adapted to connect to the corresponding line and neutral bus bars of the bus bar subsystem without wires;
sensor circuitry for monitoring the electrical path and detecting faults; and
logic circuitry coupled to the sensor circuitry for generating a fault detection signal identifying a type of fault detected by the sensor circuitry;
a third subsystem including trip control logic responsive to fault detection signals received from each of the second plurality of circuit breakers, the trip control logic programmed to selectively activate the solenoid of a selected one of circuit breakers and independently break the continuity of the corresponding electrical path in response to a selected type of fault identified by a fault detection signal received from the selected circuit breaker; and
a communications interface for daisy-chaining the third subsystem with the first and second subsystems.

4. The circuit breaker system of claim 3, wherein the communications interface of the third subsystem supports serial communications with the second subsystem in accordance with the RS-485 protocol.

5. The circuit breaker system of claim 1, wherein the wireless communications circuitry of the second subsystem comprises a port for establishing wireless communications through a wide area network subsystem.

6. The circuit breaker system of claim 1, wherein the wireless communications circuitry comprises a WiFi subsystem for communicating with home area network devices.

7. The circuit breaker system of claim 1, wherein the wireless communications circuitry comprises a ZigBee subsystem for communicating with an electrical appliance.

8. The circuit breaker system of claim 1, wherein the first subsystem further comprises metering circuitry for collecting and formatting power consumption information for transmission by the wireless communications circuitry to a system external to the circuit breaker system.

9. The circuit breaker system of claim 1, wherein the wireless communications circuitry allows wireless programming of the trip control circuitry for selectively activating the solenoid of a selected one of circuit breakers and break the continuity of the corresponding electrical path in response to a selected type of fault.

10. The circuit breaker system of claim 1, wherein the trip control circuitry is programmable for selectively activating the solenoid of a selected one of circuit breakers and break the continuity of the corresponding electrical path in response to at least one of an overload fault condition, arc fault circuit interrupt, and ground fault interrupt.

11. A circuit breaker system comprising:
a plurality of circuit breakers, each circuit breaker including:
mechanical components and a solenoid for selectively breaking electrical continuity in an electrical path between a power source and line and neutral bus bars;
sensor circuitry for monitoring the electrical path and detecting faults; and
logic circuitry coupled to the sensor circuitry for generating a fault detection signal identifying a type of fault detected by the sensor circuitry;
a first subsystem including:
trip control logic responsive to fault detection signals received from each of the plurality of circuit breakers, the trip control logic programmed to selectively activate the solenoid of a selected one of circuit breakers and break the continuity of the corresponding electrical path in response to a particular type of fault identified by a fault detection signal received from the selected circuit breaker; and
a communications interface; and
a second subsystem including:
a communications interface for exchanging signals with the communications interface of the first subsystem; and
wireless communications circuitry for establishing wireless communications with a system external to the circuit breaker system, wherein the mechanical components of each of the plurality of circuit breakers are manually resettable and the trip control logic is further operable to:

prevent reset of the selected circuit breaker by continuously activating the solenoid of the selected circuit breaker in response to a signal received by the wireless communications circuitry.

12. A circuit breaker system comprising:

a bus bar subsystem;

a plurality of circuit breakers for selectively breaking electrical continuity in a corresponding plurality of electrical paths transmitting electrical power from a power source to a corresponding line bus bar of the bus bar subsystem, each circuit breaker including independent circuitry for detecting faults on a corresponding electrical path and in response generating a fault detection signal representing a type of fault detected;

trip control logic operable to independently trip each of the circuit breakers to cause a break in the continuity of the corresponding electrical path in response to a fault detection signal representing a fault type of a particular set of fault types predetermined for the circuit breaker; and wireless communications circuitry for receiving signals for selecting the particular set of fault types for each of the circuit breakers.

13. The circuit breaker system of claim 12, wherein the trip control logic is disposed on a first circuit board and the wireless communications circuitry is disposed on a second circuit board communicating with the first circuit board through a serial interface.

14. The circuit breaker system of claim 12, wherein the trip control logic is disposed on a first circuit board daisy-chained with a like second circuit board through a first serial interface and to a third circuit board on which the wireless communications circuitry is disposed through a second serial interface.

15. The circuit breaker system of claim 14, wherein the first serial interface is an RS-485 interface and the second serial interface comprises an RS-232 interface.

16. The circuit breaker system of claim 12, further comprises metering circuitry for collecting and formatting power consumption information for transmission by the wireless communications circuitry to a system external to the circuit breaker system.

17. The circuit breaker system of claim 12, wherein particular set of fault types includes at least one fault type selected from the group consisting of an overload fault condition, an arc fault circuit interrupt, and a ground fault interrupt.

18. The circuit breaker system of claim 12, wherein each of the plurality of breakers is coupled to the corresponding line bus bar of the bus bar subsystem without wires.

* * * * *